(12) United States Patent
Takahashi et al.

(10) Patent No.: US 10,336,281 B2
(45) Date of Patent: Jul. 2, 2019

(54) AIRBAG APPARATUS (71) Applicant: HONDA MOTOR CO., LTD., Tokyo (JP)

(72) Inventors: Kei Takahashi, Wako (JP); Daiei Tonoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/227,675

(22) Filed: Aug. 3, 2016

(65) Prior Publication Data
US 2017/0036637 A1 Feb. 9, 2017

(30) Foreign Application Priority Data
Aug. 5, 2015 (JP) ................................. 2015-155371

(51) Int. Cl.
*B60R 21/213* (2011.01)
*B60R 11/00* (2006.01)

(52) U.S. Cl.
CPC ..... *B60R 21/213* (2013.01); *B60R 2011/0059* (2013.01)

(58) Field of Classification Search
CPC . B60R 21/213; B60R 21/217; B60R 21/2171; B60R 21/2173; B60R 2011/0059
See application file for complete search history.

(56) References Cited

U.S. PATENT DOCUMENTS

| | | | | |
|---|---|---|---|---|
| 6,079,732 A * | 6/2000 | Nakajima | ............. | B60R 13/025 280/728.1 |
| 6,170,861 B1 * | 1/2001 | Tietze | ..................... | B60R 21/04 280/728.2 |
| 6,217,061 B1 * | 4/2001 | Harland | .................. | B60R 21/04 280/730.2 |
| 6,530,594 B1 * | 3/2003 | Nakajima | ............. | B60R 21/213 280/728.2 |
| 7,481,448 B2 * | 1/2009 | Heigl | .................... | B60R 21/213 280/728.2 |
| 7,654,559 B2 * | 2/2010 | Hidaka | ................. | B60R 21/213 280/728.2 |

(Continued)

FOREIGN PATENT DOCUMENTS

| JP | 2007-083781 A | 4/2007 |
|---|---|---|
| JP | 2009-056891 A | 3/2009 |

(Continued)

OTHER PUBLICATIONS

Office Action dated Jan. 4, 2017, issued in counterpart Japanese Patent Application No. 2015-155371, with English translation. (6 pages).

*Primary Examiner* — Paul N Dickson
*Assistant Examiner* — Timothy Wilhelm
(74) *Attorney, Agent, or Firm* — Westerman, Hattori, Daniels & Adrian, LLP (57) ABSTRACT

There is provided a side curtain airbag apparatus. The side curtain airbag apparatus includes a bag that is inflated and unfolded, a piece of fixing hardware that is fixed to an edge portion of the bag and includes a temporary fixing claw capable of being locked to a locking portion of a vehicle body panel, and a protector that includes a lower contact portion in contact with a lower surface of a bent portion of the vehicle body panel and surrounds the bag.

6 Claims, 4 Drawing Sheets

(56) References Cited

U.S. PATENT DOCUMENTS

| | | | |
|---|---|---|---|
| 7,673,897 B2* | 3/2010 | Ochiai | B60R 21/213 |
| | | | 280/728.2 |
| 7,735,857 B2* | 6/2010 | Hidaka | B60R 21/213 |
| | | | 280/728.2 |
| 8,096,574 B2* | 1/2012 | Okimoto | B60R 21/213 |
| | | | 280/728.2 |
| 8,651,516 B2* | 2/2014 | Kim | B60R 21/213 |
| | | | 280/730.2 |
| 8,833,797 B2* | 9/2014 | Suga | B60R 13/0206 |
| | | | 280/728.2 |
| 9,022,415 B2* | 5/2015 | Kim | B60R 21/215 |
| | | | 280/728.1 |
| 9,487,175 B2* | 11/2016 | Noma | B60R 21/201 |
| 2009/0091105 A1 | 4/2009 | Okimoto et al. | |
| 2013/0292926 A1* | 11/2013 | Kim | B60R 21/213 |
| | | | 280/728.2 |

FOREIGN PATENT DOCUMENTS

| | | |
|---|---|---|
| JP | 2012-101595 A | 5/2012 |
| JP | 5180554 B2 | 4/2013 |
| JP | WO2014/061452 A1 | 9/2016 |

* cited by examiner

AIRBAG APPARATUS

CROSS REFERENCES TO RELATED APPLICATIONS

The present application claims priority under 35 U.S.C. § 119 to Japanese Patent Application No. 2015-155371, filed Aug. 5, 2015, entitled "Airbag Apparatus." The contents of this application are incorporated herein by reference in their entirety.

BACKGROUND

1. Field

The present disclosure relates to an airbag apparatus.

2. Description of the Related Art

For example, a so-called curtain airbag apparatus may be installed as an airbag apparatus at a roof side portion of a vehicle body, as described in Japanese Patent No. 5180554. A curtain airbag apparatus disclosed in Japanese Patent No. 5180554 includes a bag which is inflated and unfolded at the time of a collision, fixing hardware which fixes the bag to a vehicle body panel, and a cover which surrounds the bag so as to protect the bag.

SUMMARY

When the curtain airbag apparatus in Japanese Patent No. 5180554 is to be assembled to a vehicle body, the curtain airbag apparatus is temporarily fixed to a vehicle body panel and then permanently fixed with a bolt and the like. For example, a temporary fixing claw for being locked into a locking hole formed in the vehicle body panel is formed at the fixing hardware. When the temporary fixing claw of the fixing hardware is inserted into the vehicle body panel, and a support for the curtain airbag apparatus is removed, the weight of the curtain airbag apparatus is put on the temporary fixing claw, and the temporary fixing claw is locked on a lower edge portion of the locking hole. After that, the fixing hardware is fastened with a bolt and a nut, which means that the fixing hardware is permanently fixed.

However, the temporary fixing claw is just locked in the locking hole while the curtain airbag apparatus is temporarily fixed. The curtain airbag apparatus is likely to drop off the vehicle body panel during temporary fixation work. For this reason, there is the problem of low workability of the work of mounting the curtain airbag apparatus. For example, since the cover is not in contact with a lower surface of a bent portion formed at the vehicle body panel in Japanese Patent No. 5180554, the cover is also not in contact with the lower surface of the bent portion while the curtain airbag apparatus is temporarily fixed. If the cover is not in contact with the lower surface of the bent portion of the vehicle body panel, as described above, the curtain airbag apparatus can move upward easily with respect to the vehicle body panel while the curtain airbag apparatus is temporarily fixed. Thus, the curtain airbag apparatus may drop off easily in, for example, a case where a worker touches the curtain airbag apparatus. Since the temporary fixing claw is just locked due to the weight of the curtain airbag apparatus, as described above, the curtain airbag apparatus is likely to drop off the vehicle body panel especially if the curtain airbag apparatus is moved upward.

The present application has been made in view of the above-described problem and describes prevention of an airbag apparatus to be fixed to a vehicle body panel having a bent portion from dropping off the vehicle body panel easily while the airbag apparatus is temporarily fixed.

The present disclosure adopts the configurations below as a solution to the above-described problem.

According to a first aspect of the present disclosure, there is provided an airbag apparatus (for example, a side curtain airbag apparatus 1 according to an embodiment) which is arranged at a side of a vehicle body panel (for example, a vehicle body panel 100 according to the embodiment), the vehicle body panel including an angled portion with a bent surface (for example, a bent portion 103 according to the embodiment) having a lower surface (for example, a lower surface 103a according to the embodiment) facing downward, a side surface extending upward from the lower surface, and a locking portion (for example, a locking hole 101 according to the embodiment) formed on the side surface above the bent portion. The locking portion is capable of a temporary hanging of the airbag apparatus from the bent portion of the vehicle body panel. The airbag apparatus is configured to include a bag (for example, a bag 3 according to the embodiment) that is inflated and unfolded, a piece of fixing hardware (which constitutes at least one fixing member, for example, a metal piece 5 of fixing hardware according to the embodiment) that is fixed to an edge portion of the bag and includes a temporary fixing claw (for example, a temporary fixing claw 5c according to the embodiment) capable of being inserted, hooked, and locked to the locking portion of the vehicle body panel, and a protector (for example, a protector 6 according to the embodiment) that includes a contact portion (for example, a lower contact portion 6b according to the embodiment) in contact with the lower surface of the bent portion of the vehicle body panel and surrounds the bag.

According to the present disclosure, the protector that surrounds the bag includes the contact portion in contact with the lower surface of the bent portion of the vehicle body panel. For this reason, when the temporary fixing claws are locked to the locking portion of the vehicle body panel, the contact portion comes into contact with the lower surface of the bent portion, which restrains upward movement and rotation of the airbag apparatus. Thus, the temporary fixing claw is prevented from dropping off easily due to, for example, a touch on the airbag apparatus by a worker while the airbag apparatus is temporarily fixed. The present disclosure allows an airbag apparatus to be fixed to a vehicle body panel having a bent portion to be prevented from dropping off the vehicle body panel easily while the airbag apparatus is temporarily fixed. Additionally, according to the present disclosure, when the bag is inflated and unfolded, since the contact portion is in contact with the lower surface of the bent portion of the vehicle body panel, the protector can be prevented from moving with respect to the vehicle body panel. It is thus possible to stably inflate and unfold the bag.

According to a second aspect, the first aspect may be configured such that the contact portion includes a base plate (for example, a base plate 6b1 according to the embodiment) that is provided to stand upright from a main body (for example, a protector main body 6a according to the embodiment) of the protector and a plurality of ribs (for example, ribs 6b2 according to the embodiment) that are supported by the base plate and are each in contact with the bent portion of the vehicle body panel at an edge portion (for example, an edge portion 6b3 according to the embodiment).

According to the present disclosure, the contact portion includes the plurality of ribs to be in contact with the bent portion. For example, even if the posture of the contact portion with respect to the vehicle body panel changes slightly while the airbag apparatus is temporarily fixed, any of the ribs can be reliably brought into contact with the lower surface of the bent portion. Thus, the contact portion can be brought into contact with the lower surface of the bent portion more stably than a contact portion which comes into surface contact with the lower surface of the bent portion.

According to the present disclosure, a gap is left between the adjacent ribs. For this reason, the weight of the contact portion can be made lighter than that of a block-like contact portion, and a reduction in the weight of the airbag apparatus itself can be achieved.

According to the present disclosure, the contact portion has a structure in which the plurality of ribs are supported on the plate-like base plate. For this reason, the strength of the contact portion can be made higher than that of a plate-like contact portion which is made of only the base plate.

According to a third aspect of the present disclosure, the first or second aspect may be configured such that the bag is arranged farther away from the bent portion of the vehicle body panel than the contact portion and at a side on a vehicle interior side of the bent portion.

According to the present disclosure, the bag that is heavy among constituent elements of the airbag apparatus is arranged farther away from the bent portion than the contact portion and at a side on the vehicle interior side. Thus, upward moment acts on the contact portion due to the weight of the bag. This causes the contact portion to be pressed hard against the lower surface of the bent portion. The contact portion can be stably brought into contact with the lower surface of the bent portion.

According to a fourth aspect of the present disclosure, any one of the first to third aspects may be configured such that the protector includes an upper contact portion (for example, an upper contact portion 6c according to the embodiment) in contact with a side surface (for example, a side surface 103b according to the embodiment) of the bent portion that is connected to the lower surface from an upper side.

According to the present disclosure, the protector has the upper contact portion in addition to the above-described contact portion. The upper contact portion is brought into contact with the side surface of the bent portion. For this reason, according to the present disclosure, the airbag apparatus is restrained from moving in a direction toward the vehicle body panel while the airbag apparatus is temporarily fixed. It is thus possible to more reliably prevent the airbag apparatus from dropping off the vehicle body panel while the airbag apparatus is temporarily fixed.

According to a fifth aspect of the present disclosure, any one of the first to fourth aspects may be configured such that the piece of fixing hardware includes a plurality of pieces of fixing hardware, and the plurality of pieces of fixing hardware are fixed to the bag, and such that the contact portion is provided at a side of each of at least one of the plurality of pieces of fixing hardware.

According to the present disclosure, the contact portion is arranged in a vicinity of at least one of the plurality of pieces of fixing hardware provided. For this reason, it is possible to more reliably prevent the piece of fixing hardware from moving than in a case where the contact portion is installed far away from the piece of fixing hardware. Thus, the present disclosure allows reliable prevention of the airbag apparatus from dropping off the vehicle body panel while the airbag apparatus is temporarily fixed.

According to a sixth aspect of the present disclosure, the fifth aspect may be configured such that the contact portion is arranged for one of the pieces of fixing hardware at only one of two sides of the piece of fixing hardware.

According to the present disclosure, the work of locking the temporary fixing claw of the piece of fixing hardware into the locking portion of the vehicle body panel can be performed more easily than in a case where the contact portion is present on two sides of the piece of fixing hardware. It is thus possible to improve the workability of temporary fixation.

DESCRIPTION OF THE PREFERRED EMBODIMENTS

One embodiment of an airbag apparatus according to the present disclosure will be described below with reference to the drawings. Note that each member is appropriately rescaled to a recognizable size in the drawings below.

Figure 1:
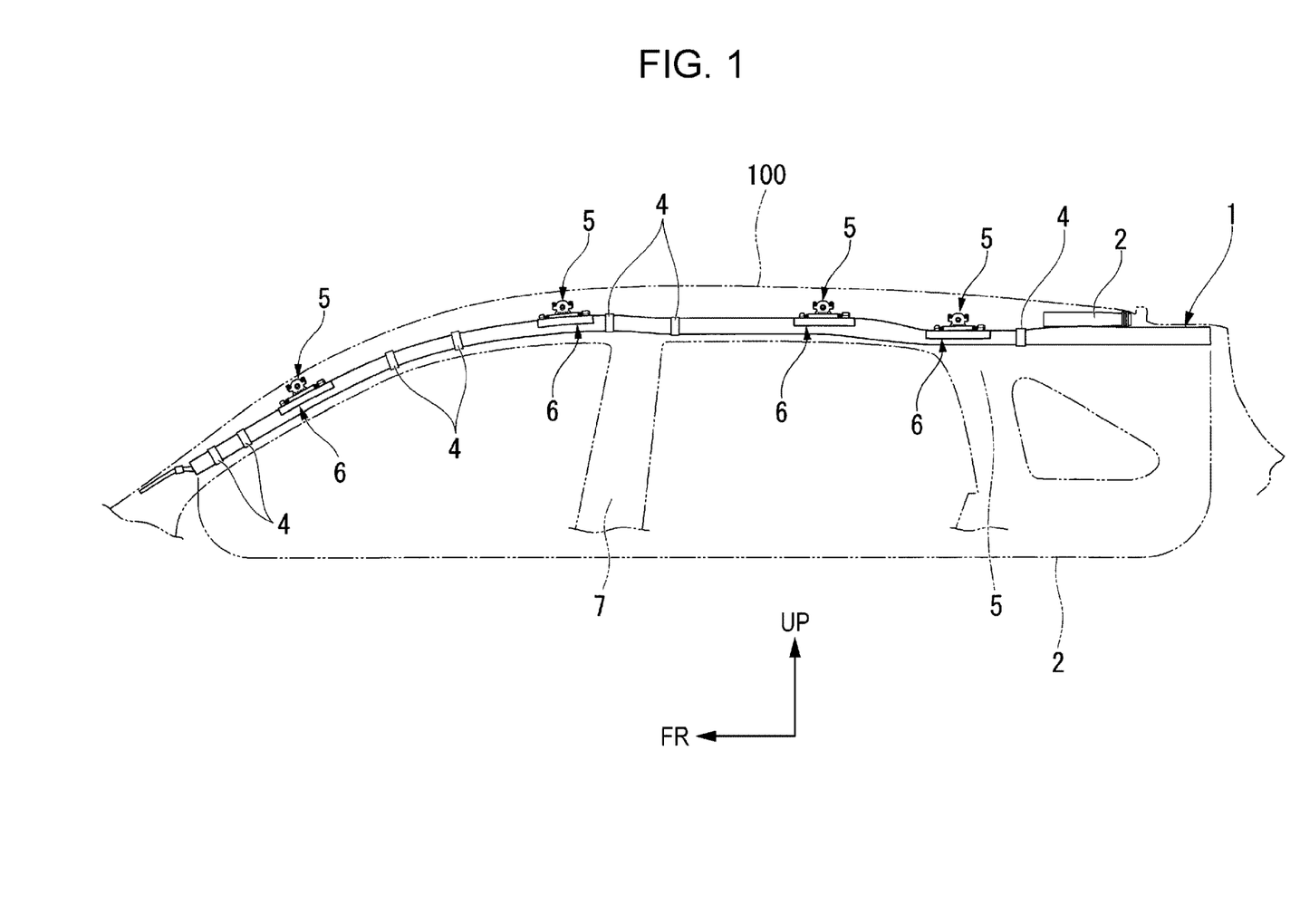
FIG. 1 is a front view showing a side curtain airbag apparatus according to one embodiment of the present disclosure and part of a vehicle body panel, to which the side curtain airbag apparatus is fixed.

FIG. 1 is a front view showing a side curtain airbag apparatus 1 (an airbag apparatus) according to the present embodiment and part of a vehicle body panel 100, to which the side curtain airbag apparatus 1 is fixed. Note that FIG. 1 is a view as viewed from a vehicle inner side and a vehicle width direction of a vehicle, on which the side curtain airbag apparatus 1 according to the present embodiment is mounted. That is, a leftward direction indicated by an arrow FR is toward a vehicle front side while an upward direction indicated by an arrow UP is toward a vehicle upper side, as shown in FIG. 1.

As shown in FIG. 1, the side curtain airbag apparatus 1 according to the present embodiment includes an inflator 2, a bag 3, binding bands 4, pieces 5 of fixing hardware, and protectors 6. The inflator 2 is a component which inflates the bag 3 by exploding gunpowder housed in the inflator 2 in accordance with an instruction from, for example, an engine control unit (ECU) to produce gas and jetting the gas to supply the gas to the bag 3. The inflator 2 is fixed to the vehicle body panel 100 and is connected to the bag 3 so as to be capable of supplying produced gas to the bag 3.

The bag 3 is a component which supports a passenger and softens the impact on the passenger by being laterally inflated and unfolded toward a vehicle interior at the time of a collision of the vehicle. The bag 3 is in the form of a thin sheet when gas is not supplied. As shown in FIG. 1, the bag 3 is wound and thus compactly housed. In the side curtain airbag apparatus 1 according to the present embodiment, an axial core direction is a front-back direction of the vehicle, and the bag 3 is arranged with a length from a front-side end to a rear-side end of the vehicle interior. A plurality of binding bands 4 are arranged in a longitudinal direction of the wound bag 3 and hold the bag 3 in a wound shape by wrapping around and fastening the wound bag 3 in a radial direction from the outside. Note that the binding bands 4 are adjusted in holding force so as not to inhibit inflation and unfolding of the bag 3 if the bag 3 is inflated and unfolded due to supply of gas from the inflator 2.

Figure 2:
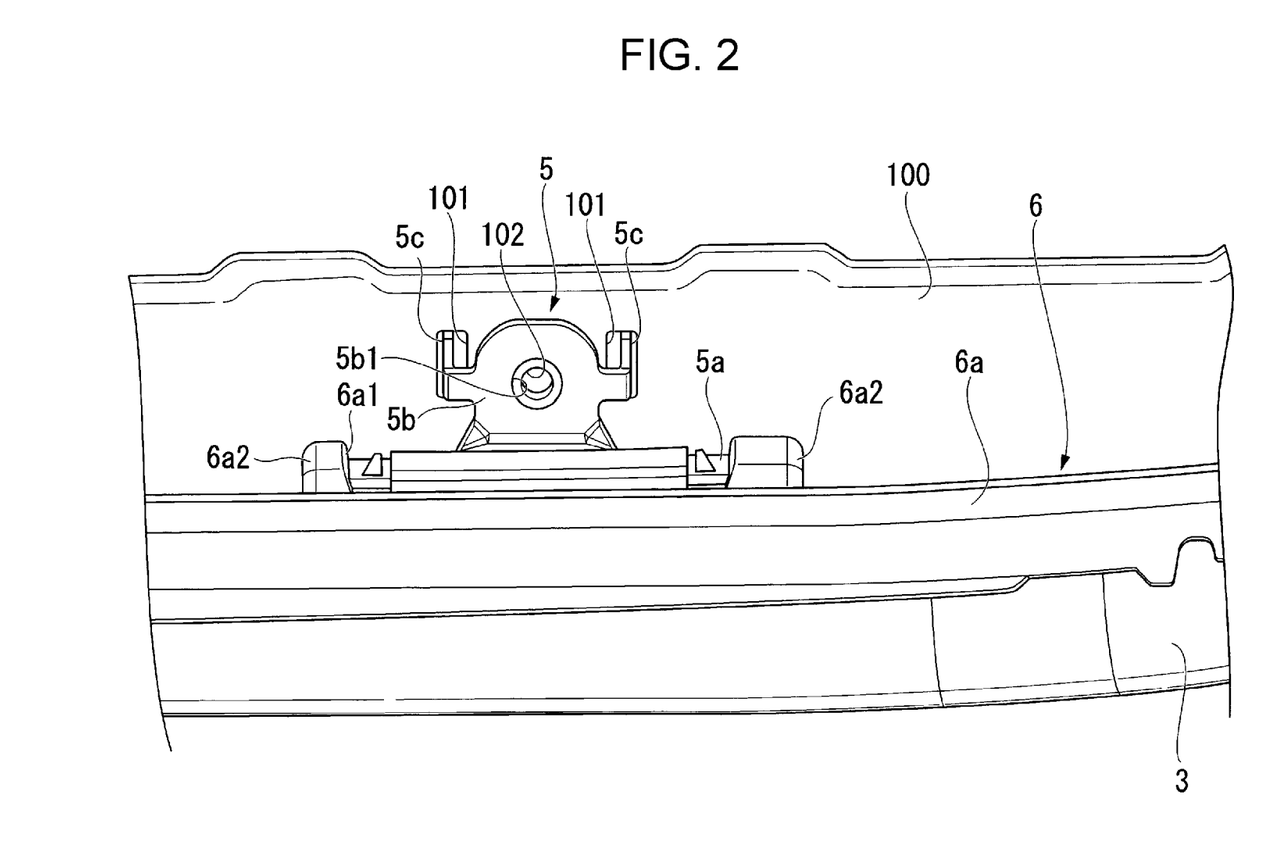
FIG. 2 is a partial enlarged view of FIG. 1 including a piece of fixing hardware and a protector of the side curtain airbag apparatus according to the one embodiment of the present disclosure.
Figure 3:
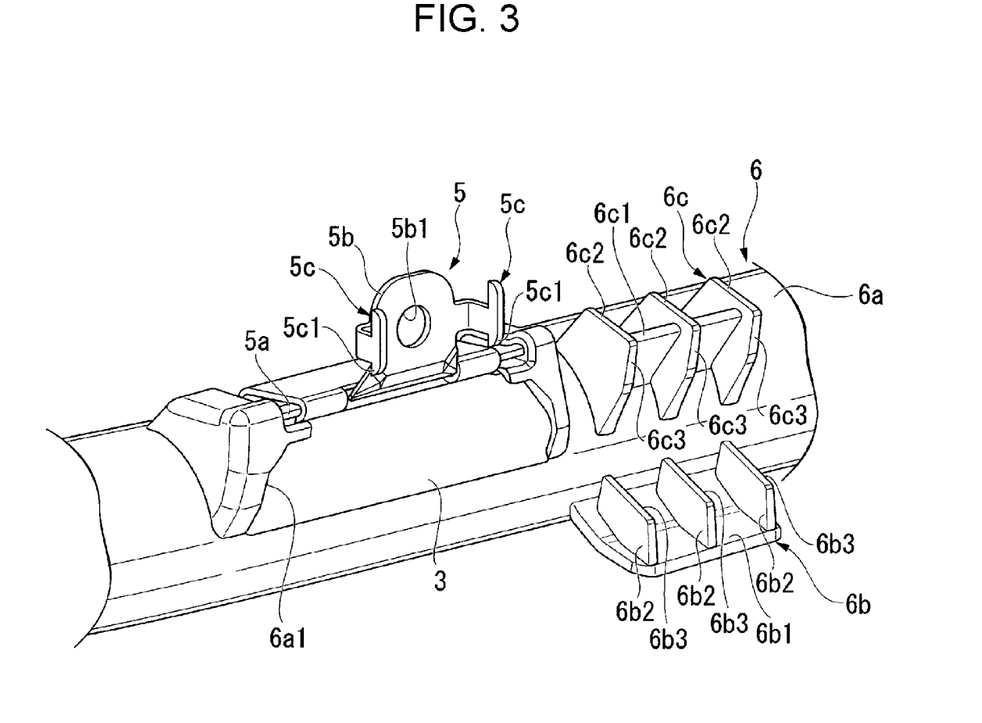
FIG. 3 is a partial enlarged perspective view including the piece of fixing hardware and the protector of the side curtain airbag apparatus according to the one embodiment of the present disclosure, as viewed from a side opposite to the side in FIG. 1.

FIG. 2 is a partial enlarged view of FIG. 1 including the piece 5 of fixing hardware and the protector 6. FIG. 3 is a partial enlarged perspective view including the piece 5 of fixing hardware and the protector 6, as viewed from a side opposite to the side in FIG. 1. The piece 5 of fixing hardware is a metallic component which is fixed to an edge portion of the bag 3 and is fastened to the vehicle body panel 100. As shown in FIGS. 2 and 3, the piece 5 of fixing hardware has a base portion 5a, a fastening portion 5b, and temporary fixing claws 5c. The base portion 5a is a plate-like member, a longitudinal direction of which faces the axial core direction of the wound bag 3, and obverse and reverse faces face upward and downward directions. The edge portion of the bag 3 is wound around and firmly fixed to the base portion 5a, and the base portion 5a serves as a connection of the piece 5 of fixing hardware to the bag 3.

The fastening portion 5b is a disk-like part which is arranged substantially at the center in a longitudinal direction of the base portion 5a and is provided to stand upright from the obverse face of the base portion 5a. A bolt insertion hole 5b1 is formed in a central portion of the fastening portion 5b and the fastening portion 5b is arranged such that a reverse face faces the vehicle body panel 100. The fastening portion 5b is directly fastened to the vehicle body panel 100 with a bolt and a nut when the side curtain airbag apparatus 1 according to the present embodiment is permanently fixed to the vehicle body panel 100.

As shown in FIG. 3, the temporary fixing claw 5c is provided to protrude from a side portion of the fastening portion 5b in a direction which the reverse face of the fastening portion 5b faces (that is, a direction toward the vehicle body panel 100). The temporary fixing claw 5c has a projecting portion 5c1 which protrudes downward. The temporary fixing claw 5c is inserted into a locking hole 101 (a locking portion) (to be described later) of the vehicle body panel 100, and the projecting portion 5c1 comes into contact with a lower edge portion of the locking hole 101 from a reverse side of the vehicle body panel 100 (an outer side of the vehicle). In this manner, the temporary fixing claw 5c is locked to the vehicle body panel 100. As shown in FIG. 3, the temporary fixing claw 5c is provided for each of side portions on two sides of the fastening portion 5b. That is, two temporary fixing claws 5c are provided for one piece 5 of fixing hardware.

As shown in FIG. 1, a plurality of pieces 5 of fixing hardware are provided in the longitudinal direction of the wound bag 3. That is, the bag 3 is fixed to the vehicle body panel 100 at a plurality of points in the longitudinal direction by the plurality of pieces 5 of fixing hardware.

The vehicle body panel 100, to which the side curtain airbag apparatus 1 is fixed, will be described. The vehicle body panel 100 constitutes part of a metallic frame of a vehicle body. As shown in FIG. 2, the vehicle body panel 100 has the locking hole 101, into which the temporary fixing claw 5c of the piece 5 of fixing hardware is to be inserted. Two locking holes 101 are formed corresponding to the temporary fixing claws 5c and are arranged at an interval equal to an interval, at which the two temporary fixing claws 5c are spaced. The vehicle body panel 100 has a bolt insertion hole 102 between the two locking holes 101. The bolt insertion hole 102 is a hole, into which a bolt inserted in the bolt insertion hole 5b1 of the fastening portion 5b is to be inserted when the side curtain airbag apparatus 1 is permanently fixed to the vehicle body panel 100.

Figure 4:
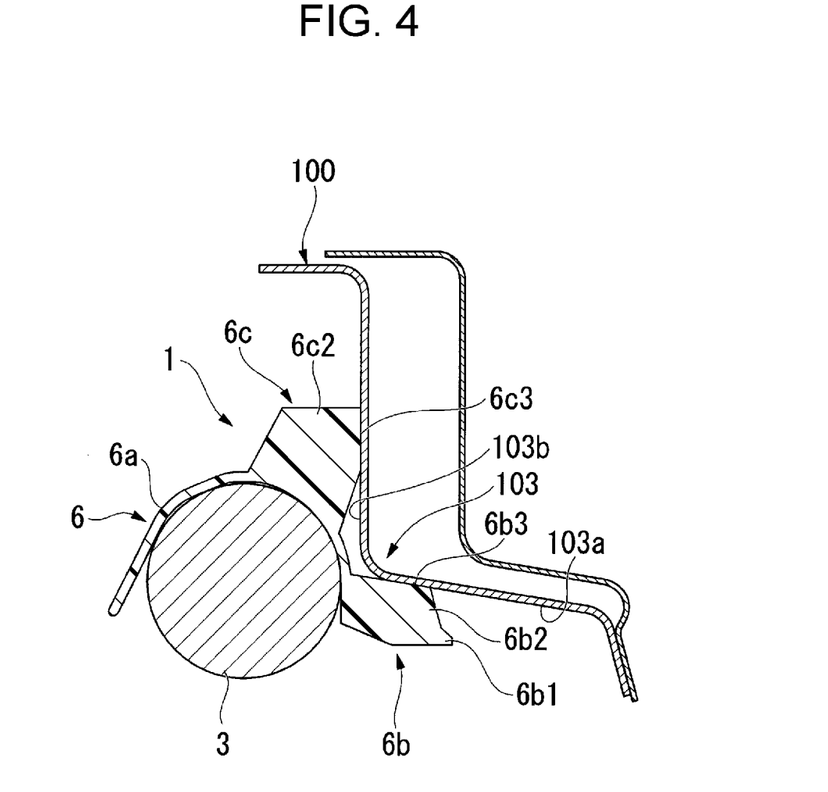
FIG. 4 is a schematic cross-sectional view of the side curtain airbag apparatus according to the one embodiment of the present disclosure and the vehicle body panel, taken along a cross-section which passes through a lower contact portion and an upper contact portion of the protector.

FIG. 4 is a schematic cross-sectional view of the side curtain airbag apparatus 1 according to the present embodiment and the vehicle body panel 100, taken along a cross-section which passes through a lower contact portion 6b and an upper contact portion 6c (to be described later) of the protector 6. As shown in FIG. 4, the vehicle body panel 100 has a bent portion 103. The bent portion 103 has a lower surface 103a which faces downward and a side surface 103b which is connected from an upper side to the lower surface 103a. In the bent portion 103, the side surface 103b faces the side curtain airbag apparatus 1 and is connected from an upper side to an edge portion on the side curtain airbag apparatus 1 side of the lower surface 103a. Note that the locking holes 101 and the bolt insertion hole 102 described above are formed in the side surface 103b.

Referring back to FIGS. 2 and 3, the protector 6 is a resin-made component which is installed for each piece 5 of fixing hardware. That is, one protector 6 is installed for each piece 5 of fixing hardware. As shown in FIGS. 2 and 3, the protector 6 has a protector main body 6a, the lower contact portion 6b (a contact portion), and the upper contact portion 6c.

The protector main body 6a is a part which is open toward the vehicle interior and is substantially C-shaped in cross-section. The protector main body 6a is arranged so as to surround the wound bag 3 from above. As shown in FIG. 3, the protector main body 6a has an opening 6a1 which exposes the piece 5 of fixing hardware and two mounting portions 6a2 which are installed such that the opening 6a1 is sandwiched between the mounting portions 6a2 in the axial core direction of the wound bag 3. The mounting portions 6a2 are parts, into which ends of the base portion 5a of the piece 5 of fixing hardware are to be inserted. As shown in FIG. 3, the ends of the base portion 5a are inserted into the mounting portions 6a2, and the protector 6 is supported by the piece 5 of fixing hardware.

As shown in FIG. 3, the lower contact portion 6b is provided at a side of the piece 5 of fixing hardware and below the upper contact portion 6c. The lower contact portion 6b has a base plate 6b1 and a plurality of ribs 6b2. The base plate 6b1 is a plate-like part which protrudes from the protector main body 6a toward the vehicle body panel 100. The base plate 6b1 is provided to stand upright from the protector main body 6a such that obverse and reverse faces face upward and downward.

Each rib 6b2 is a part which is provided to stand upward from an upper surface of the base plate 6b1. The rib 6b2 is formed such that an upper edge portion 6b3 extends from the protector main body 6a toward the vehicle body panel 100, and the upper edge portion 6b3 is brought into contact with the lower surface 103a of the bent portion 103 of the vehicle body panel 100. Three ribs 6b2 as described above are formed to be arrayed in the axial core direction of the wound bag 3 on the upper surface of the base plate 6b1. That is, the lower contact portion 6b includes a plurality of ribs 6b2 having the upper edge portions 6b3 in contact with the lower surface 103a of the bent portion 103 of the vehicle body panel 100.

As shown in FIG. 3, the upper contact portion 6c is provided at a side of the piece 5 of fixing hardware and above the lower contact portion 6b. That is, the upper contact portion 6c is provided on the same side as the lower contact portion 6b of the piece 5 of fixing hardware. The upper contact portion 6c has a base plate 6c1 and a plurality of ribs 6c2. The base plate 6c1 is a plate-like part which protrudes from the protector main body 6a obliquely upward toward the vehicle body panel 100. The base plate 6c1 is provided to stand upright from the protector main body 6a such that obverse and reverse faces face a substantially horizontal direction.

Each rib 6c2 is a plate-like part having obverse and reverse faces facing the axial core direction of the wound bag 3 such that a substantially central portion is connected to the base plate 6c1. In the rib 6c2, part of an edge portion 6c3 facing the vehicle body panel 100 is brought into contact with the side surface 103b of the bent portion 103 of the vehicle body panel 100. Three ribs 6c2 as described above are formed at the base plate 6c1 to be arrayed in the axial core direction of the wound bag 3. That is, the upper contact portion 6c includes a plurality of ribs 6c2, part of the edge portion 6c3 of which is brought into contact with the side surface 103b of the bent portion 103 of the vehicle body panel 100.

The protectors 6 all include the lower contact portion 6b and the upper contact portion 6c. That is, the side curtain airbag apparatus 1 according to the present embodiment has the lower contact portion 6b and the upper contact portion 6c at a side of each piece 5 of fixing hardware. The lower contact portion 6b and the upper contact portion 6c provided for one piece 5 of fixing hardware are provided at only one of two sides of the piece 5 of fixing hardware. That is, as shown in FIG. 3, the lower contact portion 6b and the upper contact portion 6c are provided on only the right-hand side in FIG. 3 for the piece 5 of fixing hardware in the present embodiment.

When the side curtain airbag apparatus 1 according to the present embodiment with the above-described configuration is to be mounted to the vehicle body panel 100, the temporary fixing claws 5c of each piece 5 of fixing hardware are first inserted into the locking holes 101 of the vehicle body panel 100 to lock the temporary fixing claws 5c to the vehicle body panel 100. When the temporary fixing claws 5c of all the pieces 5 of fixing hardware are locked to the vehicle body panel 100, the side curtain airbag apparatus 1 according to the present embodiment is temporarily fixed to the vehicle body panel 100.

A bolt (not shown) is inserted into the bolt insertion hole 5b1 of the fastening portion 5b of each piece 5 of fixing hardware and the bolt insertion hole 102 of the vehicle body panel 100, and a nut is screwed on the bolt, thereby fastening together the piece 5 of fixing hardware and the vehicle body panel 100. When all the pieces 5 of fixing hardware and the vehicle body panel 100 are fastened together, the side curtain airbag apparatus 1 according to the present embodiment is permanently fixed to the vehicle body panel 100.

The side curtain airbag apparatus 1 according to the present embodiment includes the bag 3 that is inflated and unfolded, the piece 5 of fixing hardware that is fixed to an edge portion of the bag 3 and has the temporary fixing claws 5c capable of being locked into the locking holes 101 of the vehicle body panel 100, and the protector 6 that has the lower contact portion 6b in contact with the lower surface 103a of the bent portion 103 of the vehicle body panel 100 and surrounds the bag 3. For this reason, when the temporary fixing claws 5c are locked to the vehicle body panel 100, the lower contact portion 6b comes into contact with the lower surface 103a of the bent portion 103, as shown in FIG. 4, which restrains upward movement and rotation of the side curtain airbag apparatus 1. Thus, the temporary fixing claw 5c is prevented from dropping off easily due to, for example, a touch on the side curtain airbag apparatus 1 by a worker while the side curtain airbag apparatus 1 is temporarily fixed. The side curtain airbag apparatus 1 according to the present embodiment allows the side curtain airbag apparatus 1 to be prevented from dropping off the vehicle body panel 100 easily while the side curtain airbag apparatus 1 is temporarily fixed. Additionally, in the side curtain airbag apparatus 1 according to the present embodiment, when the bag 3 is inflated and unfolded, since the lower contact portion 6b is in contact with the lower surface 103a of the bent portion 103 of the vehicle body panel 100, the protector 6 can be prevented from moving with respect to the vehicle body panel 100. It is thus possible to stably inflate and unfold the bag 3.

In the side curtain airbag apparatus 1 according to the present embodiment, the lower contact portion 6b has the base plate 6b1 that is provided to stand upright from the protector main body 6a and the plurality of ribs 6b2, which are supported by the base plate 6b1 and whose edge portions 6b3 are in contact with the bent portion 103 of the vehicle body panel 100. For example, even if the posture of the lower contact portion 6b with respect to the vehicle body panel 100 changes slightly while the side curtain airbag apparatus 1 is temporarily fixed, any of the ribs 6b2 can be reliably brought into contact with the lower surface 103a of the bent portion 103. Thus, the lower contact portion 6b can be brought into contact with the lower surface 103a of the bent portion 103 more stably than a lower contact portion which comes into surface contact with the lower surface 103a of the bent portion 103.

In the side curtain airbag apparatus 1 according to the present embodiment, a gap is left between the adjacent ribs 6b2. For this reason, the weight of the lower contact portion 6b can be made lighter than that of a block-like lower contact portion, and a reduction in the weight of the side curtain airbag apparatus 1 itself can be achieved.

In the side curtain airbag apparatus 1 according to the present embodiment, the lower contact portion 6b has a structure in which the plurality of ribs 6b2 are supported on the plate-like base plate 6b1. For this reason, the strength of the lower contact portion 6b can be made higher than that of a plate-like lower contact portion which is made of only the base plate 6b1.

Note that, in the side curtain airbag apparatus 1 according to the present embodiment, the upper contact portion 6c is structured to have the base plate 6c1 and the plurality of ribs 6c2, like the lower contact portion 6b. For this reason, the upper contact portion 6c brings about the same working effects as those of the lower contact portion 6b described above.

In the side curtain airbag apparatus 1 according to the present embodiment, the bag 3 is arranged farther away from the bent portion 103 of the vehicle body panel 100 than the lower contact portion 6b and at a side on the vehicle interior side of the bent portion 103. For this reason, the bag 3 that is heavy among constituent elements of the side curtain airbag apparatus 1 is arranged farther away from the bent portion 103 than the lower contact portion 6b and at a side on the vehicle interior side. Thus, upward moment acts on the lower contact portion 6b due to the weight of the bag 3. This causes the lower contact portion 6b to be pressed hard against the lower surface 103a of the bent portion 103. The lower contact portion 6b can be stably brought into contact with the lower surface 103a of the bent portion 103.

In the side curtain airbag apparatus 1 according to the present embodiment, the protector 6 has the upper contact portion 6c that is in contact with the side surface 103b of the bent portion 103. For this reason, the side curtain airbag apparatus 1 is restrained from moving in a direction toward the vehicle body panel 100 while the side curtain airbag apparatus 1 is temporarily fixed. It is thus possible to more reliably prevent the side curtain airbag apparatus 1 from dropping off the vehicle body panel 100 while the side curtain airbag apparatus 1 is temporarily fixed.

In the side curtain airbag apparatus 1 according to the present embodiment, a plurality of pieces 5 of fixing hardware are fixed to the bag 3, and the lower contact portion 6b and the upper contact portion 6c are provided at a side of each piece 5 of fixing hardware. For this reason, it is possible to more reliably prevent the piece 5 of fixing hardware from moving than in a case where the lower contact portion 6b and the upper contact portion 6c are installed far away from the piece 5 of fixing hardware. Thus, the side curtain airbag apparatus 1 according to the present embodiment allows reliable prevention of the side curtain airbag apparatus 1 from dropping off the vehicle body panel 100 while the side curtain airbag apparatus 1 is temporarily fixed.

In the side curtain airbag apparatus 1 according to the present embodiment, the lower contact portion 6b and the upper contact portion 6c are arranged at only one of two sides of the piece 5 of fixing hardware for one piece 5 of fixing hardware. For this reason, the work of inserting the temporary fixing claw 5c of the piece 5 of fixing hardware into the locking hole 101 of the vehicle body panel 100 can be performed more easily than in a case where the lower contact portion 6b and the upper contact portion 6c are present on two sides of the piece 5 of fixing hardware. It is thus possible to improve the workability of temporary fixation.

The preferred embodiment of the present disclosure has been described above with reference to the drawings. The present disclosure, however, is not limited to the embodiment. The shapes, combination, and the like of the constituent elements illustrated in the embodiment are merely examples, and various changes can be made on design requirements and the like without departing from the scope of the present disclosure.

For example, the above-described embodiment has described an example in which an airbag apparatus according to the present disclosure is applied to the side curtain airbag apparatus 1. The present disclosure, however, is not limited to this, and the airbag apparatus can also be applied to any other airbag apparatus. Although the lower contact portion 6b and the upper contact portion 6c are provided at a side of each piece 5 of fixing hardware in the embodiment, the lower contact portion 6b and the upper contact portion 6c may be provided at a side of at least one piece 5 of fixing hardware. In the embodiment, a temporary fixing claw may be locked using a notch or a hook instead of a locking portion.

What is claimed is:

1. An airbag apparatus to be arranged along an angled portion of a side wall of a vehicle body panel, the angled portion including a lower surface extending in a substantially horizontal direction and facing downward and a side surface extending upward from the lower surface, the side surface having a locking portion capable of a temporary hanging of the airbag apparatus therefrom, the airbag apparatus comprising:
an airbag that can be inflated and unfolded;
at least one fixing member that is directly fixed to an edge of the airbag and has a temporary fixing claw having a projecting portion which protrudes downward such that the projecting portion of the temporary fixing claw is capable of engagement with the locking portion of the side surface, thereby hanging the airbag apparatus therefrom; and
a protector that holds the airbag and has a contact portion, an upper edge portion of the contact portion extending in the substantially horizontal direction and being in direct contact with the lower surface of the angled portion of the vehicle body panel along the substantially horizontal direction when the airbag apparatus is hung on the angled portion, wherein
the contact portion includes
a base plate that is provided to extend from a main body of the protector generally in a vehicle width direction, and
a plurality of ribs that extend upward from the base plate, each of the plurality of ribs each having the upper edge portion which is in direct contact with the lower surface of the angled portion of the vehicle body panel when the airbag apparatus is hung on the angled surface.

2. The airbag apparatus according to claim 1, wherein the airbag is arranged away from the angled portion of the vehicle body panel than the contact portion and at a side on a vehicle interior side of the angled portion.

3. The airbag apparatus according to claim 1, wherein the protector has an upper contact portion to be in contact with the side surface of the angled portion that is connected to the lower surface from an upper side when the airbag apparatus is hung on the angled surface.

4. The airbag apparatus according to claim 1, wherein a plurality of the fixing members are fixed to the airbag, and
the contact portion is provided at a side of at least one of the plurality of fixing members.

5. The airbag apparatus according to claim 4, wherein the contact portion is arranged at only one side of two sides of each of the at least one of the fixing members.

6. The airbag apparatus according to claim 1, wherein the at least one fixing member is formed of a metal plate which comprises a base portion around which the edge portion of the airbag is wound such that edge portion is firmly and directly fixed to the base portion of the at least one fixing member.

\* \* \* \* \*